(12) United States Patent
May

(45) Date of Patent: Jun. 8, 2010
(10) Patent No.: US 7,733,343 B2

(54) VIRTUAL SHADOW FOR PHYSICAL OBJECT PLACED ON SURFACE

(75) Inventor: Gregory J. May, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 582 days.

(21) Appl. No.: 11/767,956

(22) Filed: Jun. 25, 2007

(65) Prior Publication Data
US 2008/0316145 A1 Dec. 25, 2008

(51) Int. Cl.
*G06T 15/50* (2006.01)
*G06T 15/60* (2006.01)
*G06T 1/00* (2006.01)

(52) U.S. Cl. ........................ 345/426; 345/418

(58) Field of Classification Search ............ None
See application file for complete search history.

(56) References Cited

U.S. PATENT DOCUMENTS

| | | | |
|---|---|---|---|
| 5,316,308 A | 5/1994 | Stembokas | |
| 5,327,177 A | 7/1994 | DesJardins et al. | |
| 6,018,350 A | 1/2000 | Lee et al. | |
| 6,290,604 B2* | 9/2001 | Miyamoto et al. | 463/30 |
| 7,061,488 B2 | 6/2006 | Randel | |
| 7,064,755 B2 | 6/2006 | Mech et al. | |
| 2002/0068626 A1* | 6/2002 | Takeda et al. | 463/30 |
| 2004/0135739 A1* | 7/2004 | Fukushima et al. | 345/6 |
| 2004/0239670 A1* | 12/2004 | Marks | 345/419 |
| 2006/0026875 A1* | 2/2006 | Elffers | 40/560 |
| 2007/0236485 A1* | 10/2007 | Trepte | 345/207 |
| 2008/0166022 A1* | 7/2008 | Hildreth | 382/107 |

OTHER PUBLICATIONS

Raskar, R.; Welch, G.; Low, K-L.; Bandyopadhyay, D., "Shader Lamps: Animating Real Objects with Image Based Illumination", Eurographics Workshop on Rendering, Jun. 2001 (EGWR 2001, TR2001-021).*
Andrei State, Gentaro Hirota, David T. Chen, William F. Garrett, Mark A. Livingston, "Superior Augmented Reality Registration by Integrating Landmark Tracking and Magnetic Tracking", Dept of Computer Science, University of North Carolina at Chapel Hill 1996.*

* cited by examiner

*Primary Examiner*—Daniel F Hajnik

(57) ABSTRACT

The placement of a physical object at a location on a surface is detected. A virtual shadow for the physical object is displayed at the location on the surface.

20 Claims, 4 Drawing Sheets

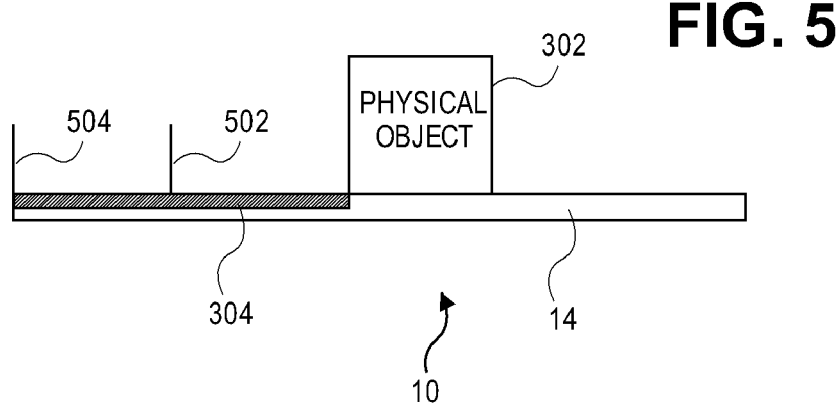
FIG. 5
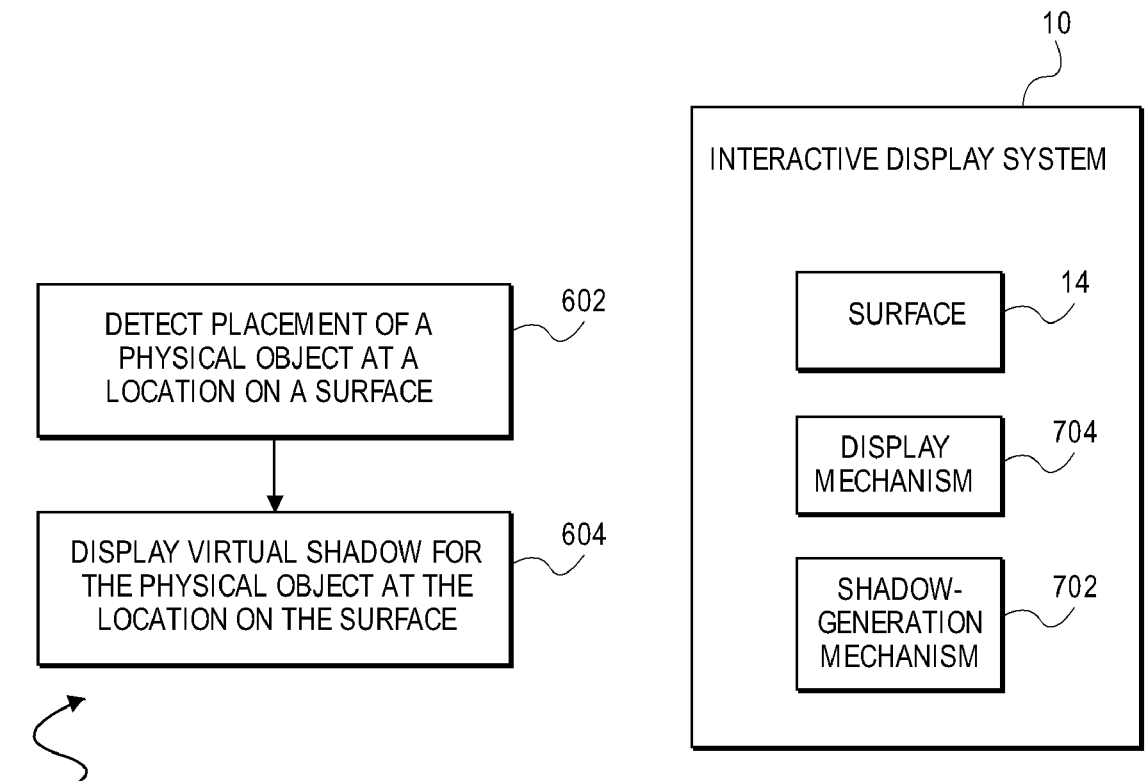
FIG. 6
FIG. 7

VIRTUAL SHADOW FOR PHYSICAL OBJECT PLACED ON SURFACE

BACKGROUND

Electronic devices have become very adept at enabling us to view and manipulate electronically displayed images. However, electronic devices are less adept at the intersection between "real life" and electronically displayed images. In other words, electronic devices are adept at manipulating and displaying electronically displayed images, but less adept at interacting with real, physical objects, like books, game pieces, and so on.

BRIEF DESCRIPTION OF THE DRAWINGS

FIG. 5 is a diagram depicting how a virtual shadow for a physical object can convey information, according to an embodiment of the invention.

FIG. 6 is a flowchart of a method, according to an embodiment of the invention.

FIG. 7 is a block diagram of an interactive display system, according to an embodiment of the invention.

DETAILED DESCRIPTION OF THE DRAWINGS

Figure 1:
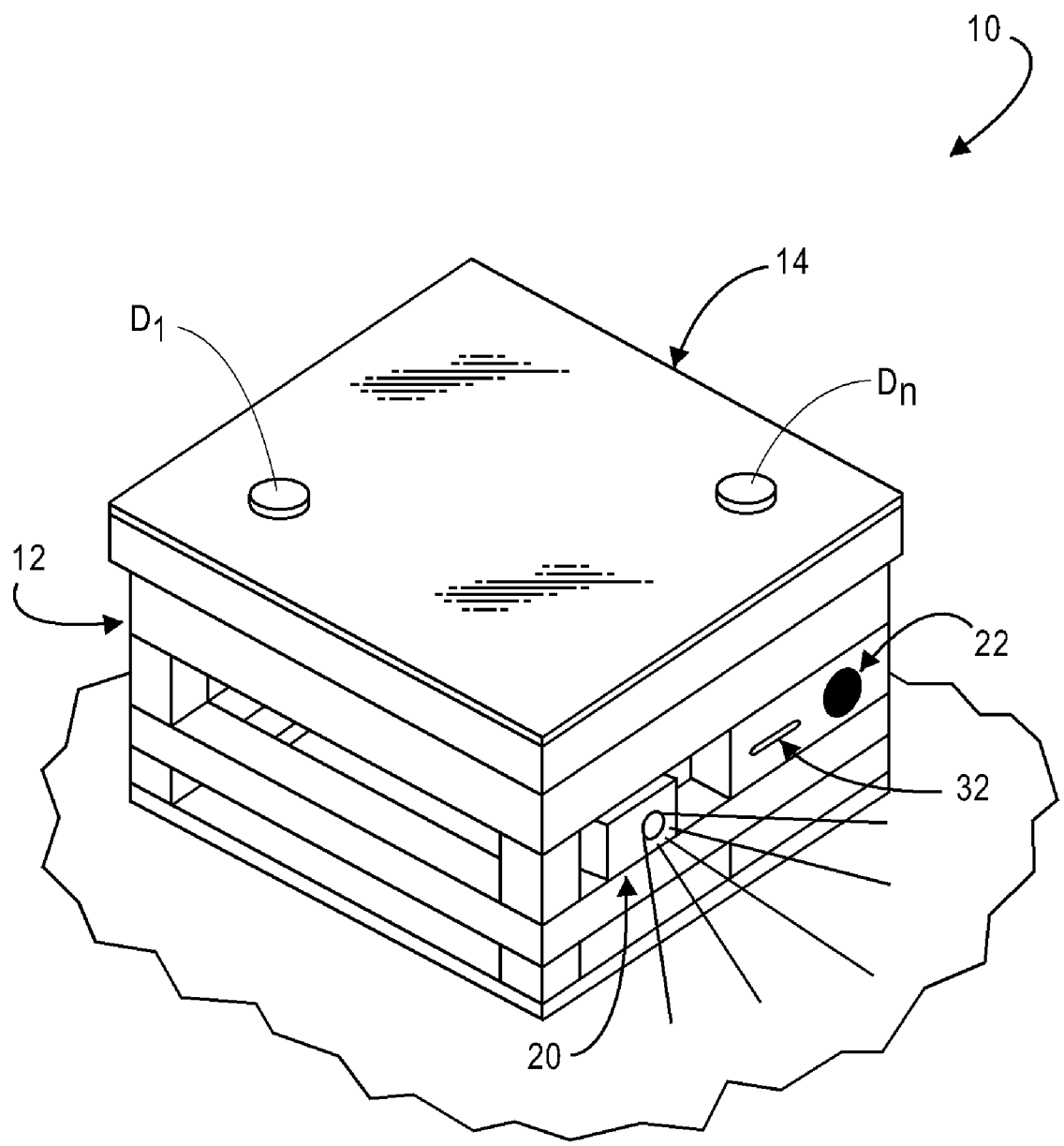
FIG. 1 is a diagram of a perspective view of an embodiment of an interactive display system, according to an embodiment of the invention.
Figure 2:
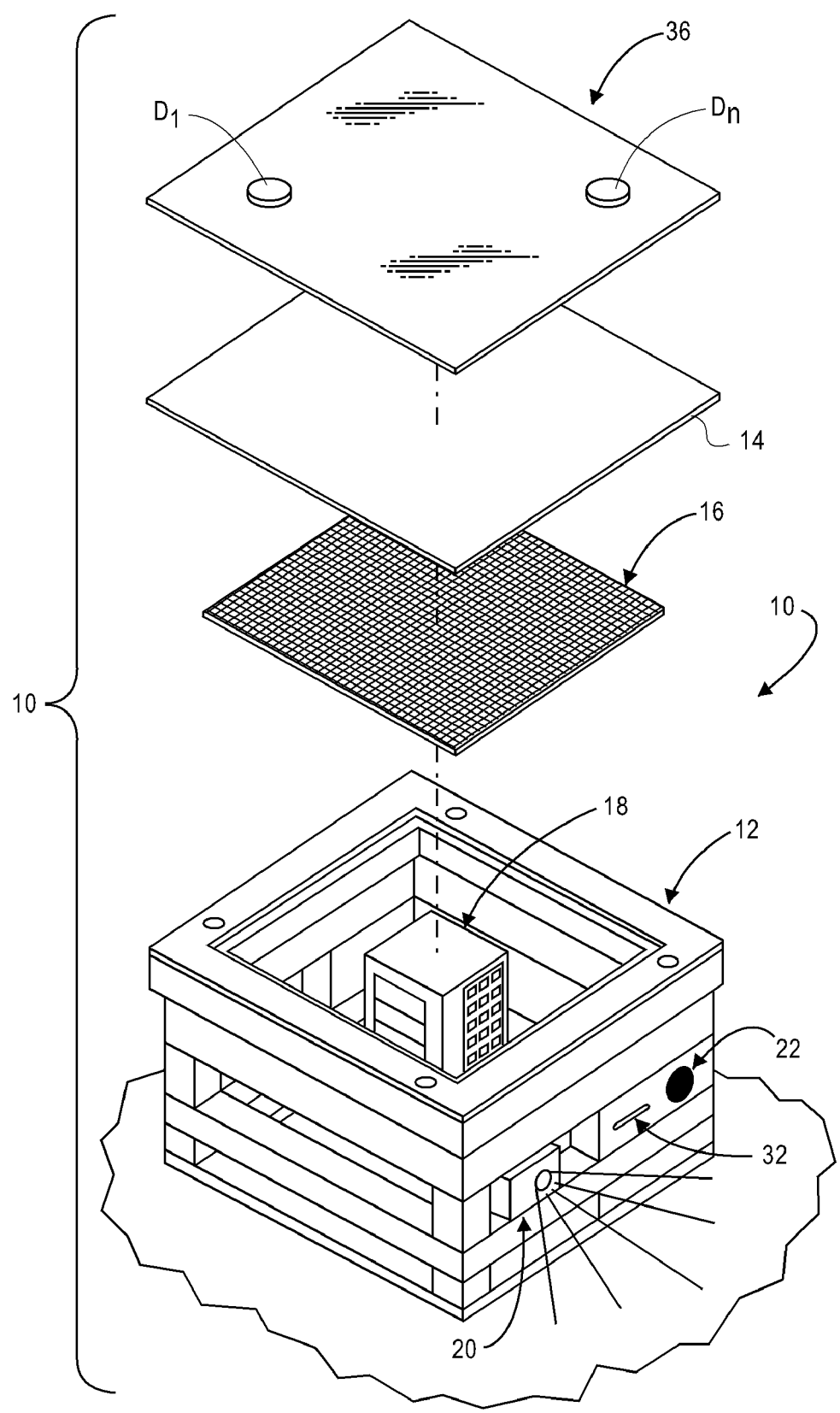
FIG. 2 is a diagram of an exploded view of the embodiment of the interactive display system of FIG. 1, according to an embodiment of the invention.

FIGS. 1 and 2 show an embodiment of an interactive display system 10, according to an embodiment of the present invention. The interactive display system 10 is depicted in FIGS. 1 and 2 as embodied in a table 12, with the table surface functioning as the display surface 14. Thus, in at least one embodiment, the surface 14 is at least substantially horizontal. Multiple users can view and access the display surface 14 by sitting around the table 12. The users may each have his or her own data-receiving device D1 through Dn. It is noted that the physical embodiment of the display system 10 can take any number of forms other than that of a table. The interactive display system 10 itself may be more generally referred to as an electronic device.

The interactive display system 10 can include a touch-sensitive display surface 14, a display device 16, and a controller 18. According to one embodiment, the controller 18 is configured to generate electrical image signals indicative of viewable images, such as computer programs, movie videos, video games, Internet web pages, and so on, which are provided for generation to the display device 16. The display device 16, in response to the electrical signals, generates digital optical (viewable) images that are viewable on the display surface 14. The controller 18 may receive data and other information to generate the image signals from various sources, such as hard disk drives, compact discs (CD's) or digital versatile discs (DVD's) 32, computer servers, local and/or wide area networks, the Internet, and so on. The controller 18 may also provide additional output in the form of projected images from an auxiliary projector 20 and sound from a speaker 22.

As shown in FIGS. 1 and 2, the interactive display system 10 can include a variety of other components, such as a projector 20, configured to simultaneously project the content of the display surface 14 onto a wall-mounted screen, for instance. Alternatively, the projector 20 may display content that is different than the content displayed on the display surface 14. The interactive display system 10 may also include one or more speakers 22 for producing audible sounds that accompany the visual content on the display surface 14. Further, the interactive display system 10 may include one or more devices for storing and retrieving data, such as a CD or DVD drive, hard disk drives, flash memory ports, and so on.

The systems and methods of embodiments of the present invention are not limited to displaying information to a display surface 14 using a particular type of display device 16. For instance, any number of suitable display devices may be used, such as a liquid crystal display (LCD), a plasma display, or another type of flat panel display, as well as a cathode-ray tube (CRT) or another type of display device. The display device 16 may also assume a variety of forms in differing embodiments of the present invention. In general, the display device 16 generates a viewable digital image on the display surface 14 by projecting a plurality of pixels of light onto the display surface 14. Each viewable image may be made up of millions of pixels, a fewer number pixels, or a greater number of pixels. Each pixel may be individually controlled and addressable by the display device 16 to have a certain color (or gray-scale). The combination of many light pixels of different colors (or gray-scales) on the display surface 14 generates a viewable image or "frame." Continuous video and graphics may be generated by sequentially combining frames together, as in a motion picture.

One embodiment of a display device 16 includes a projector device, such as a digital light projector (DLP) having a digital micro-mirror device (DMD) configured to vary the projection of light pixels onto the display surface 14. Other embodiments could include, but are in no way limited to, diffractive light devices (DLD), liquid crystal on silicon (LCOS) projection, as well as non-projection-type displays, such as plasma displays, and liquid crystal displays (LCD's). Additionally, other display technologies could be substituted for the DLP (16) without varying from the scope of the present invention. The display device 16 is more generally a display mechanism. In one embodiment, the display surface 14 is considered to be part of the display device 16, whereas in another embodiment, the display surface 14 is separate from the display device 16 and is disposed over the display device 16.

The touch-sensitive display surface 14 may, in one embodiment of the present invention, be present to provide the users of the system 10 with a form of user input. The touch-sensitive display surface 14 is sensitive to the placement of physical objects, such as the fingertips of users, and so on, thereon. The touch-sensitive display surface 14 may employ any of a number of different types of touch-detection technology, such as resistive, capacitive, infrared, optical wave, and/or other types of touch-detection technologies. In one embodiment, a backside imaging camera renders the surface 14 touch sensitive by detecting user input on the surface 14.

Embodiments of the invention are concerned with displaying virtual shadows for physical objects placed on the display surface 14. The physical objects are real, tangible objects. By comparison, the virtual shadows are not actual shadows, but are virtual in that they are created by the display device 16 appropriately turning on and off pixels to render a simulated shadow for the physical object. Thus, upon a physical object being placed at a location on the display surface 14, the presence of the object at this location is detected, and in response the display device 16 displays a virtual shadow on the display surface 14 that corresponds to the physical object.

Figure 3:
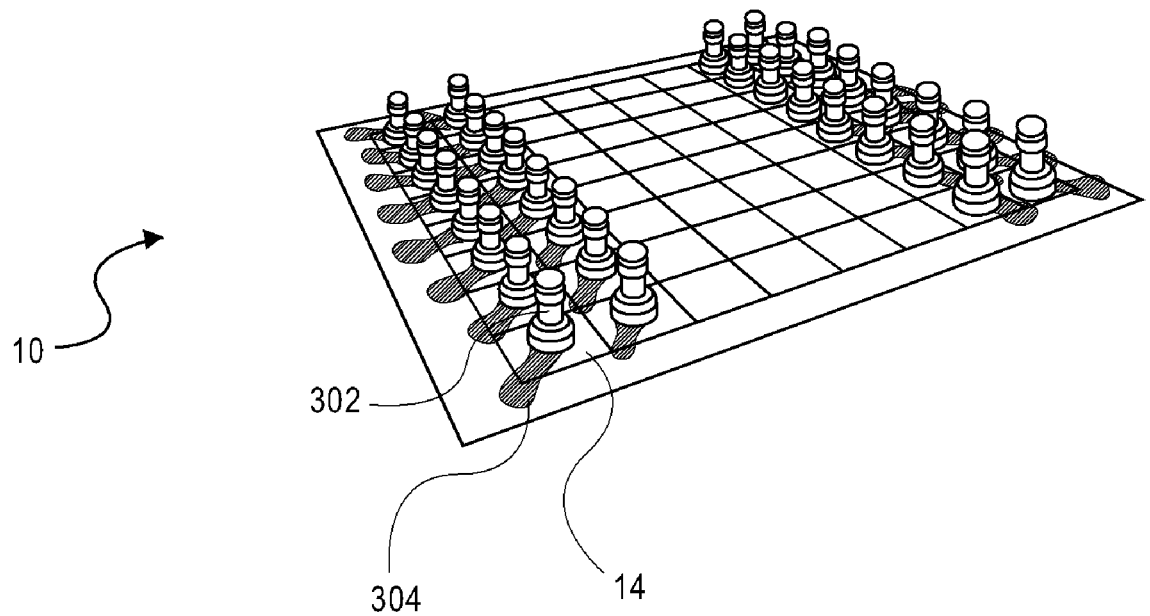
FIG. 3 is a diagram depicting virtual shadows for physical objects placed on a display surface, according to an embodiment of the invention.

FIG. 3 shows the interactive display system 10 in which exemplary virtual shadows for physical objects are being displayed, according to an embodiment of the invention. In the example of FIG. 3, the physical objects placed on the display surface 14 are physical game pieces, such as chess pieces like the chess piece 302. Virtual shadows for these physical objects are displayed on the display surface 14, such as the virtual shadow 304 for the chess piece 302. The virtual shadows are generated as can be appreciated by those of ordinary skill within the art, utilizing ray-tracing technology or other types of technologies.

The virtual shadow for a physical object may correspond to the shape of the physical object, no different than if the virtual shadow were a real shadow being cast by the physical object in relation to an actual or real light source. However, because the shadow for a physical object placed on the display surface 14 of the interactive display system 10 is virtual (i.e., simulated), and not an actual or a real shadow generated in response to an actual or real light source, the virtual shadows can be manipulated in ways that provide for additional benefits. Some examples of such virtual shadow manipulation are now presented.

Figure 4:
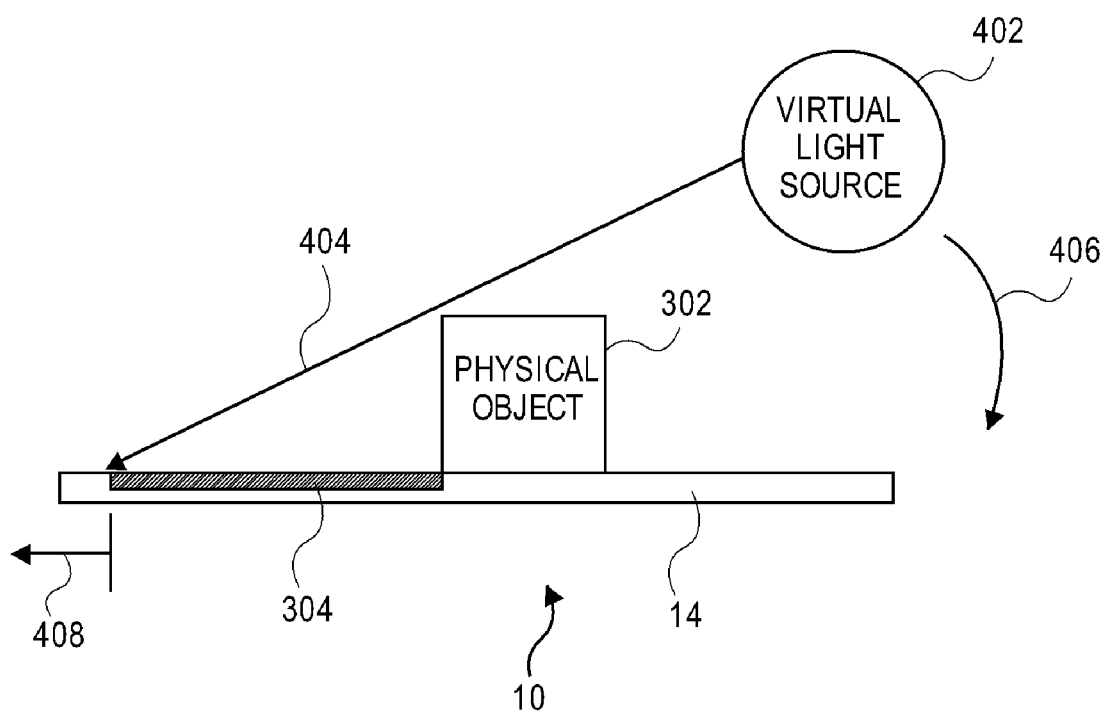
FIG. 4 is a diagram depicting how a virtual light source can be used to manipulate the virtual shadow for a physical object placed on a display surface, according to an embodiment of the invention.

FIG. 4 shows how the virtual shadow 304 for the physical object 302 can be manipulated to signify the passage of time, according to an embodiment of the invention. As before, the physical object 302 has been placed on the display surface 14 of the interactive display system. The virtual shadow 304 is displayed on the display surface 14 by being generated in relation to the position of a virtual light source 402. The virtual light source 402 is not an actual or real light source, but rather is a virtual light source, the position of which in relation to the physical object 302 dictates the length of the virtual shadow 304 based on a virtual light ray 404 emanating from the virtual light source 402.

In one embodiment, to signify the passage of time, over a period of time the virtual shadow 304 dynamically changes in length based on the virtual light source 402 being positioned downwards, as indicated by the arrow 406. That is, no different than real outdoors shadows growing longer as the sun sinks into the horizon, the virtual shadow 304 increases in length, as indicated by the arrow 408, as the virtual light source 402 decreases in position in relation to the physical object 302. In this manner, the virtual shadow 304 indicates passage of time, by manipulating the virtual light source 402 that is used to determine the size of the virtual shadow 304.

For example, in a game being played on the interactive display system, when a user moves a game piece, the virtual light source may reset to a position of twelve noon. As the other user contemplates his or her next move, the virtual light source may slowly descend towards the horizon of the display surface 14, such that the virtual shadows for the game pieces grow longer as the user is thinking about his or her next move. Once the virtual light source 402 has completely descended past the horizon of the display surface 14, this may signify that the user is out of time for making a move, such that he or she may forfeit his or her turn.

In this respect, the virtual shadow provides at least two benefits. First, the virtual shadow is informational, in that the virtual shadow provides information regarding the game being played with the physical objects. It can be stated that in this respect, the virtual shadow provides information regarding the physical object (i.e., regarding the game with which the physical object is being played). The information of the example that has been presented is the length of time that the user has left to make his or her next move in the game being played.

Second, the virtual shadow provides entertainment value for the users playing the game using the physical objects. It can be stated in this respect that the users are associated with the physical objects, in that they are playing a game using the physical objects. The entertainment value revolves at least around the novelty of seeing virtual shadows displayed on the display surface 14 for physical objects that have been placed on the surface 14 of the interactive display system 10.

The virtual shadow 304 that has been described in relation to FIG. 4 is a dynamic virtual shadow, because it is animated over a period of time while the physical object 302 remains placed at a location on the display surface 14. The animation in the example of FIG. 4 is the lengthening of the shadow 304 over time. In another embodiment, the virtual shadow 304 may be static, such that it remains unchanged and is not animated while the physical object 302 remains placed on the display surface 14 at a given location.

Other types of dynamism are also encompassed by embodiments of the invention, to provide entertainment value, information, or for other purposes. For example, within a game using game pieces, like chess or checkers, a user may capture one of his or her opponent's game pieces by moving a piece onto the location or space occupied by a piece of his or her opponent. The virtual shadows for these two pieces may display a short animation depicting the conquering of the latter piece by the former piece. For example, if a knight game piece is overtaking a pawn game piece in the game of chess, a battle may be showed via the virtual shadows, in which a stylized knight virtual shadow is depicting as winning the battle with a stylized pawn virtual shadow. In this manner, the virtual shadows for different physical objects placed on the display surface 14 can also interact with one another. In addition, the virtual shadows can interact with the physical objects themselves. In the example of a knight game piece overtaking a pawn game piece, the virtual shadow for the knight game piece may perform an animation in relation to the physical pawn piece.

Other types of information, besides the passage of time, are also encompassed by embodiments of the invention. FIG. 5 shows how the virtual shadow 304 for the physical object 302 can be manipulated to signify such other information, according to an embodiment of the invention. As before, the physical object 302 has been placed on the display surface 14 of the interactive display system. In the example of FIG. 5, the physical object 302 may be a checkers game piece. Under the rules of checkers, a checkers game piece is prohibited from moving backwards in relation to the player who is using the checkers game piece. However, once the checkers game piece reaches the other side, it is crowned, which means that it is able to move in any direction. Typically, two checkers are stacked on top of one another to indicate a crowned checker.

However, in the example of FIG. 5, the physical object 302 remains physically the same, regardless of whether it represents an uncrowned checker or a crowned checker. Rather, the length of the virtual shadow 304 for the physical object 302 changes in length to convey this information (i.e., whether the object 302 represents an uncrowned or a crowned checker). When the physical object 302 represents an uncrowned checker, the length of its virtual shadow 304 is shorter, and may extend only to the mark 502 in FIG. 5. By comparison, when the physical object 302 represents a crowned checker, the length of its virtual shadow 304 may become longer, and extend to the mark 504 in FIG. 5. In this way, the virtual shadow 304 provides information to the users as to which checkers are crowned and which are uncrowned.

In another example, the virtual shadow 304 for the physical object 302 may not have a shape corresponding to the shape of the physical object 302. For instance, in a game in which the game pieces have different levels of power, the physical game pieces may all be the same, but the shapes of the virtual shadows, or their sizes, may differ in correspondence to the power levels of the game pieces. Such power levels may be more generally referred to as properties of the physical game pieces. A physical game piece having more power than another game piece may have a different shape, may be longer, and so on, as compared to a physical game piece having less power. Thus, the virtual shadow 304 for the physical object 302 may correspond to the shape of the physical object 302, no different than if a real or actual light source were causing the object 302 to cast a shadow, or it may not correspond to the shape of the physical object 302.

For instance, the virtual shadow 304 may change based on a change in shape of the physical object 302, or based on a change in "power" of the physical object 302 in the game being played, even if the shape of the object 302 does not change. In the game of checks, for instance, a checkers piece may be crowned, which typically results in a physical transformation of the checkers piece increasing in height. Therefore, the virtual shadow 304 may correspondingly increase in size. However, even if the checkers piece does not increase in height, the virtual shadow 304 may nevertheless increase in size to indicate that the piece has been crowned.

By having the virtual shadows for the physical objects not having shapes corresponding to the shapes of the physical objects, a common set of game pieces can be used for a variety of different games. For example, all of the game pieces may be cylinders of the same height. To play the game of chess using these game pieces, the virtual shadows displayed for the game pieces may indicate the types of chess piece that the physical game pieces represent.

Other examples of using virtual shadows for physical objects for entertainment value specifically include the following. In a game in which the physical objects are the game pieces, the interactive display system 10 may detect that one of the players is in a particularly tough position within the game. In response, the virtual shadows for the game pieces remaining on the display surface 14 may act out in unison, as a chorus, to taunt this player when it is his or her turn. Likewise, when a player makes a particularly skillful move, the virtual shadows may act out in unison to congratulate the player.

The virtual shadows for such physical game pieces may further represent the personalities or the alter egos of the game pieces as the game progresses. Different virtual shadows may be displayed depending on the position on the display surface 14 at which a physical game piece has been placed, to signify the movement of a game piece into the other player's territory, for instance. Furthermore, the virtual shadows for the game pieces may provide the users with textual or numeric clues or indicators, as another type of information that can be presented within the virtual shadows. In addition, the virtual shadows can represent the unique personalities of the players playing the game in question, or of the game pieces themselves.

The virtual shadows can further provide guidance to players in a training or learning mode of a game being played. For example, the virtual shadows may indicate which piece should move next, by increasing the size of that piece's virtual shadow, for instance. As another example, the virtual shadow for a game piece may be distorted to show a suggested path as to how the game piece is being suggested to move in the game being played.

FIG. 6 shows a method 600, according to an embodiment of the invention. The method 600 is performed in relation to the interactive display system 10 that has been described. The placement of a physical object at a location on the display surface 14 is detected (602), where, as has been described, the display surface 14 may be part of the display device 16, or disposed over the display device 16. For instance, the display surface 14 may be a touch-sensitive surface that is able to detect the placement of the physical object thereon. Detection of placement can include detecting which physical object (i.e., its unique identity) has been placed at a given location on the surface 14. For example, it may be able to be detected that a king chess piece has been placed at a given location, as opposed to, for instance, a pawn chess piece.

In response, a virtual shadow is displayed for the physical object at the location on the display surface 14 (602), by the display device 16. The virtual shadow may be static (i.e., unmoving and unchanging), or may be dynamic (i.e., animated). The virtual shadow may correspond to the shape of the physical object, or not correspond to the shape of the physical object. The virtual shadow may represent information regarding the physical object, and/or provide entertainment value for users associated with the physical object, among other benefits.

FIG. 7 shows a block diagram of the interactive display system 10, according to an embodiment of the invention. The interactive display system 10 is specifically depicted as including the display surface 14, a display mechanism 704, and a shadow-generation mechanism 702. The interactive display system 10 in the embodiment of FIG. 7 can include other components as well, such as those that have been described in relation to FIG. 1.

The display mechanism 704 is a generalization of the display device 16 that has been described. The display surface 14 may be part of the display mechanism 704, or disposed over the display mechanism 704. The shadow-generation mechanism 702 may be part of the controller 18 of FIG. 1, and may be implemented in software, hardware, or a combination of software and hardware.

The shadow-generation mechanism 702 causes the display mechanism 704 to display a virtual shadow for a physical object placed at a location on the display surface 14, as has been described. As such, when the physical object is placed on the display surface 14 at a particular location thereof, such placement is detected, such as by the display surface 14 where the surface 14 is a touch-sensitive surface. In response, the mechanism 702 generates a virtual shadow for the physical object, and causes the display mechanism 704 to display the virtual shadow.

We claim:

1. A method comprising:
    detecting placement of a real-world physical object at a location on a surface; and,
    displaying a computer-generated virtual shadow for the physical object at the location on the surface in an interactive gaming environment,
    wherein detecting the placement of the physical object at the location on the surface comprises one or more of:
        detecting the placement of physical object at the location on an at least substantially horizontal surface;
        detecting the placement of the physical object at the location on the surface disposed over a display mechanism, the virtual shadow being displayed by the display mechanism;
        detecting the placement of the physical object at the location on the surface of the display mechanism, the virtual shadow being displayed by the display mechanism; and,
        detecting the placement of the physical object at the location on a touch-sensitive surface,
    wherein the virtual shadow does not correspond to the shape of the physical Object, the virtual shadow is animated over a period of time even when the physical object remains stationary, and the virtual shadow reflects a personality or alter ego of the physical object in order to provide entertainment value for one or more users associated with the physical object.

2. The method of claim 1, wherein the virtual shadow further represents information regarding the physical object.

3. The method of claim 1, further comprising changing the virtual shadow for at least the period of time, signifying passage of time, based on changing position of a virtual light source on a basis of which the virtual shadow is generated.

4. The method of claim 1, wherein the virtual shadow for the physical object is further displayed as one or more of:
  interacting with one or more of a virtual shadow of a second physical object or the second physical object; and,
  being dynamically displayed in unison with dynamic display of virtual shadows for other objects that have been placed on the surface.

5. The method of claim 1, wherein the virtual shadow for the physical object further corresponds to a property of the physical object.

6. The method of claim 1, wherein the virtual shadow further represents one or more of:
  guidance to a user of the physical object; and,
  a textual and/or a numeric identifier associated with the physical object.

7. The method of claim 1, wherein the virtual shadow for the physical object is displayed based on the location on the surface at which the physical object has been placed.

8. An electronic device comprising:
  a display mechanism;
  a surface;
  a detection mechanism to detect placement of a real-world physical object at a location on the surface; and,
  a shadow-generation mechanism to cause the display mechanism to display a computer-generated virtual shade for the physical object placed at the location on the surface,
  wherein the detection mechanism is to one or more of:
    detect the placement of the physical object at the location on the surface where the surface is at least substantially horizontal surfaces;
    detect the placement of the physical object at the location on the surface where the surface is disposed over the display mechanism; and,
    detect the placement of the physical object at the location on a touch-sensitive surface, where the surface includes the touch-sensitive surface and the detection mechanism,
  wherein the virtual shadow does not correspond to the shape of the physical object, the virtual shadow is animated over a period of time even when the physical object remains stationary, and the virtual shadow reflects a personality or alter ego of the physical object in order to provide entertainment value for one or more users associated with the physical object.

9. The electronic device of claim 8, wherein the virtual shadow further represents information regarding the physical object.

10. The electronic device of claim 8, wherein the shadow-generation mechanism is further to change the virtual shadow for at least the period of time, signifying passage of time, based on changing position of a virtual light source on a basis of which the virtual shadow is generated.

11. The electronic device of claim 8, wherein the virtual shadow for the physical object is further displayed as one or more of:
  interacting with one or more of a virtual shadow of a second physical object or the second physical object; and
  being dynamically displayed in unison with dynamic display of virtual shadows for other objects that have been placed on the surface.

12. The electronic device of claim 8, wherein the virtual shadow for the physical object further corresponds to a property of the physical object.

13. The electronic device of claim 8, wherein the virtual shadow further represents one or more of:
  guidance to a user of the physical object; and,
  a textual and/or a numeric identifier associated with the physical object.

14. The electronic device of claim 8, wherein the virtual shadow for the physical object is displayed based on the location on the surface at which the physical object has been placed.

15. An electronic device comprising:
  a display mechanism;
  a surface;
  a detection mechanism to detect placement of a real-world physical object at a location on the surface; and,
  means for causing the display mechanism to display a computer-generated virtual shade for the physical object placed at the location on the surface,
  wherein the detection mechanism is to one or more of;
    detect the placement of the physical object at the location on the surface where the surface is an at least substantially horizontal surface,
    detect the placement of the physical object at the location on the surface where the surface is disposed over the display mechanism; and,
    detect the placement of the physical object at the location on a touch-sensitive surface, where the surface includes the touch-sensitive surface and the detection mechanism,
  wherein the virtual shadow does not correspond to the shape of the physical object, the virtual shadow is animated over a period of time even when the physical object remains stationary, and the virtual shadow reflects a personality or alter ego of the physical object in order to provide entertainment value for one or more users associated with the physical object.

16. The electronic device of claim 15, wherein the virtual shadow further represents information regarding the physical object.

17. The electronic device of claim 15, wherein the means is further for changing the virtual shadow for at least the period of time, signifying passage of time, based on changing position of a virtual light source on a basis of which the virtual shadow is generated.

18. The electronic device of claim 15, wherein the virtual shadow for the physical object is further displayed as one or more of:
  interacting with one or more of a virtual shadow of a second physical object or the second physical object; and,
  being dynamically displayed in unison with dynamic display of virtual shadows for other objects that have been placed on the surface.

19. The electronic device of claim 15, wherein the virtual shadow for the physical object further corresponds to a property of the physical object.

20. The electronic device of claim 15, wherein the virtual shadow further represents one or more of:
  guidance to a user of the physical object; and,
  a textual and/or a numeric identifier associated with the physical object.

* * * * *

UNITED STATES PATENT AND TRADEMARK OFFICE
CERTIFICATE OF CORRECTION

PATENT NO. : 7,733,343 B2  Page 1 of 1
APPLICATION NO. : 11/767956
DATED : June 8, 2010
INVENTOR(S) : Gregory J. May It is certified that error appears in the above-identified patent and that said Letters Patent is hereby corrected as shown below:

In column 6, line 46, in Claim 1, delete "of physical" and insert -- of the physical --, therefor.

In column 6, line 60, in Claim 1, delete "Object," and insert -- object, --, therefor.

In column 7, line 35, in Claim 8, after "is" insert -- an --.

In column 7, line 36, in Claim 8, delete "surfaces;" and insert -- surface: --, therefor.

In column 7, line 64, in Claim 11, delete "and" and insert -- and, --, therefor.

In column 8, line 22, in Claim 15, delete "of;" and insert -- of: --, therefor.

Signed and Sealed this

Twenty-eighth Day of September, 2010

David J. Kappos
*Director of the United States Patent and Trademark Office*